(12) United States Patent
Yang et al.

(10) Patent No.: US 12,346,112 B2
(45) Date of Patent: Jul. 1, 2025

(54) ROBOT DYNAMIC OBSTACLE AVOIDANCE METHOD BASED ON MULTIMODAL SPIKING NEURAL NETWORK

(71) Applicant: DALIAN UNIVERSITY OF TECHNOLOGY, Liaoning (CN)

(72) Inventors: Xin Yang, Liaoning (CN); Xiaopeng Wei, Liaoning (CN); Yang Wang, Liaoning (CN); Qiang Zhang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 175 days.

(21) Appl. No.: 18/373,623

(22) Filed: Sep. 27, 2023

(65) Prior Publication Data
US 2024/0028036 A1    Jan. 25, 2024

(30) Foreign Application Priority Data
Mar. 9, 2023    (CN) .......................... 202310221408.0

(51) Int. Cl.
| | | |
|---|---|---|
| G05D 1/00 | (2024.01) | |
| G05D 1/02 | (2020.01) | |
| G06V 10/80 | (2022.01) | |
| G06V 10/82 | (2022.01) | |
| G06V 20/58 | (2022.01) | |

(52) U.S. Cl.
CPC ......... G05D 1/0088 (2013.01); G05D 1/0214 (2013.01); G05D 1/0248 (2013.01); G06V 10/80 (2022.01); G06V 10/82 (2022.01); G06V 20/58 (2022.01)

(58) Field of Classification Search
CPC .. G05D 1/0088; G05D 1/0214; G05D 1/0248; G05D 1/242; G05D 1/243; G05D 2109/10; G05D 2111/10; G05D 2111/17; G05D 1/633; G05D 1/0246; G05D 1/0257; G06V 10/80; G06V 10/82; G06V 20/58; Y02T 10/40
See application file for complete search history.

(56) References Cited

U.S. PATENT DOCUMENTS

2019/0041835 A1*   2/2019   Cella ...................... G16Z 99/00

\* cited by examiner

*Primary Examiner* — Rodney A Butler
(74) *Attorney, Agent, or Firm* — MUNCY, GEISSLER, OLDS & LOWE, P.C.

(57) ABSTRACT

The present invention provides a robot dynamic obstacle avoidance method based on a multimodal spiking neural network. The present invention realizes a robot obstacle avoidance method in a dynamic environment by fusing laser radar data and processed event camera data and combining with the intrinsic learnable threshold of the spiking neural network for a scenario comprising dynamic obstacles. It solves the difficulty of failure of obstacle avoidance due to the difficulty in perceiving the dynamic obstacles in the obstacle avoidance task of a robot. The present invention helps the robot to fully perceive the static information and the dynamic information of the environment, uses the learnable threshold mechanism of the spiking neural network for efficient reinforcement learning training and decision making, and realizes autonomous navigation and obstacle avoidance in the dynamic environment. An event data enhanced model is combined to better adapt to the dynamic environment for obstacle avoidance.

4 Claims, 4 Drawing Sheets

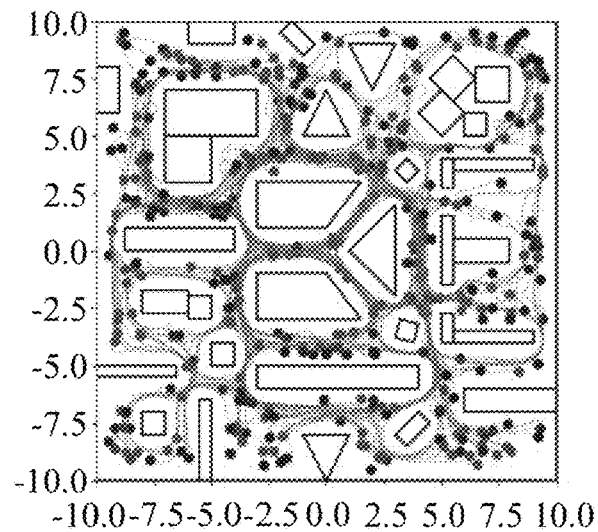
Fig. 2(a-1)
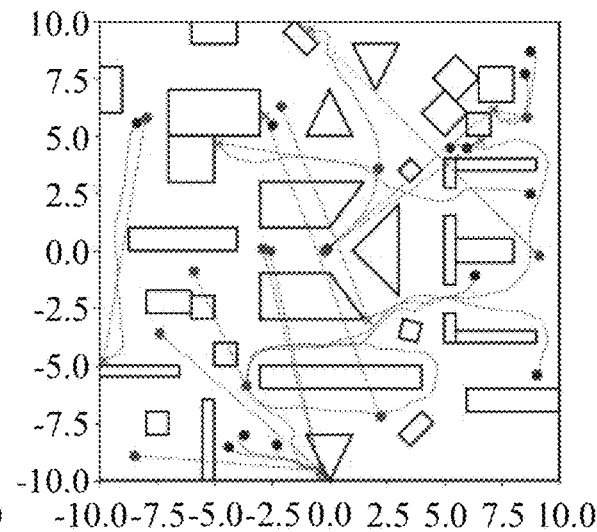
Fig. 2(a-2)
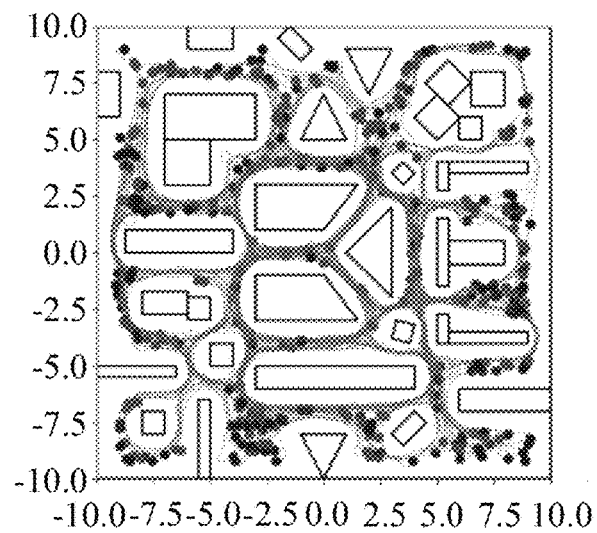
Fig. 2(b-1)
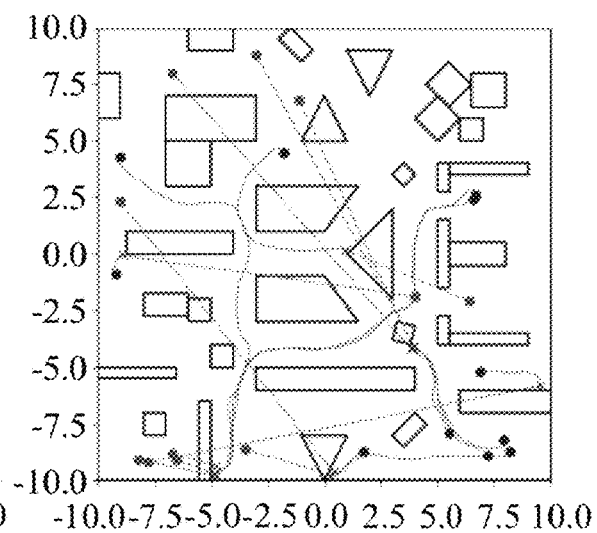
Fig. 2(b-2)

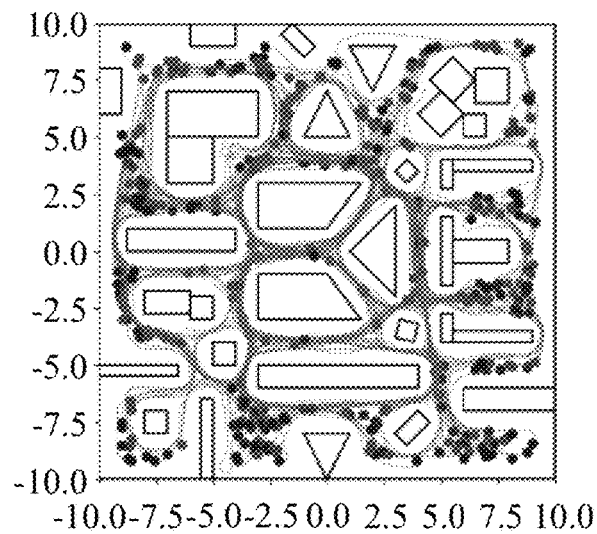
Fig. 2(c-1)
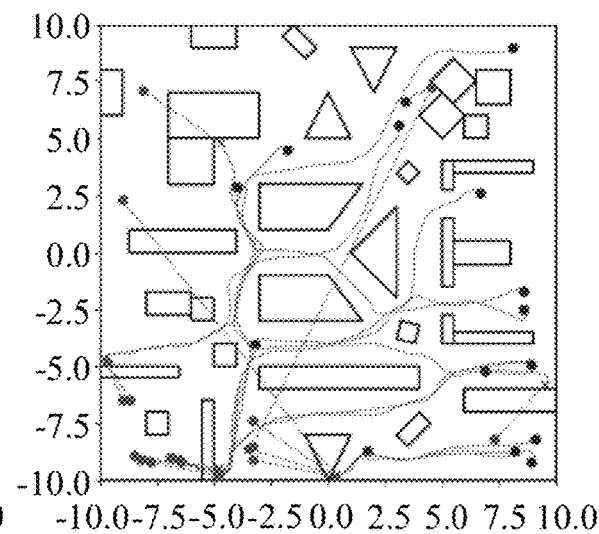
Fig. 2.0(c-2)
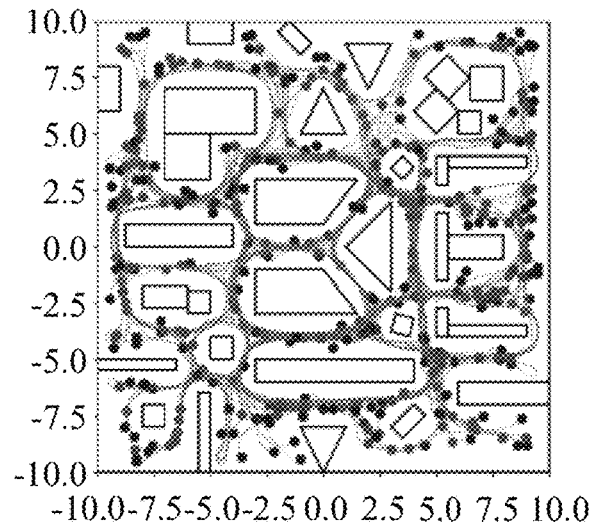
Fig. 2(d-1)
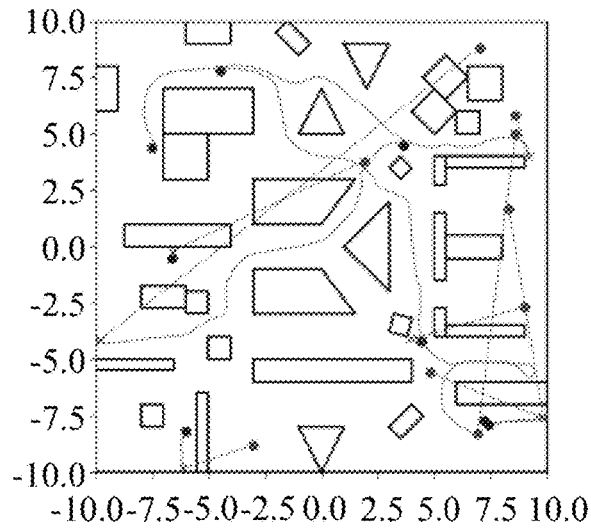
Fig. 2(d-2)

ROBOT DYNAMIC OBSTACLE AVOIDANCE METHOD BASED ON MULTIMODAL SPIKING NEURAL NETWORK

TECHNICAL FIELD

The present invention relates to the field of navigation and obstacle avoidance in the robot field, in particular to a robot dynamic obstacle avoidance method based on a multimodal spiking neural network.

BACKGROUND

The obstacle avoidance task of the robot means that the robot can navigate to a target point autonomously without any collision with the obstacle in a relatively complex scene, which has great practical application value. With the rapid development of artificial intelligence technology, obstacle avoidance-related tasks of the robot, such as sweeping robots, unmanned driving, smart warehouses and smart logistics, have achieved significant performance improvement.

Although some methods based on artificial neural networks have been successfully applied to the obstacle avoidance tasks, their high energy consumption limits their large-scale use in the field of the robots. As the third generation of artificial neural networks, a spiking neural network "Bohte S M, Kok J N, La Poutre H. Error-backpropagation in temporally encoded networks of spiking neurons [J]. Neurocomputing, 2002, 48(1-4): 17-37." has the characteristics of time continuity, high energy efficiency, fast processing and biological rationality, making its combination with the obstacle avoidance tasks more widespread and reasonable.

However, there are not only fixed obstacles in the actual obstacle avoidance scenarios where some complex dynamic obstacles often exist, such as passing passers-by, moving machines, suddenly thrown other objects, etc. These objects will have a serious influence on the traditional laser radar strategy, and there is still a lack of relevant research methods to process such objects at present. The traditional laser radar obstacle avoidance strategy "Tang G, Kumar N, Michmizos K P. Reinforcement co-learning of deep and spiking neural networks for energy-efficient mapless navigation with neuromorphic hardware[C]/2020 IEEE/RSJ International Conference on Intelligent Robots and Systems (IROS). IEEE, 2020: 6090-6097." focuses on the perception of static objects, and often lacks an effective processing method for the dynamic obstacles that move suddenly in the environment, which disables navigation and obstacle avoidance systems. Therefore, full and efficient perception of the dynamic obstacles is an urgent task in the field of robot obstacle avoidance.

Most of the existing robot obstacle avoidance and navigation methods adopt deep reinforcement learning as a learning mode, which is popular because it can learn independently without manual collection of annotated data sets. Reinforcement learning is a "trial and error" process which is often learned in a virtual environment and then transferred to a real scenario. In order to narrow the gap between virtuality and reality, laser radar data, which is simple in data form and easy to learn, is generally used. However, the perception of the dynamic obstacles that move rapidly by the laser radar data is not complete enough to implement efficient obstacle avoidance strategies.

An event camera is a biomimetic sensor that asynchronously measures changes in light intensity in a scenario and then outputs events, thereby providing very high temporal resolution (up to 1 MHz) with very low power consumption. Because the changes in light intensity are calculated on a log scale, the camera can operate within a very high dynamic range (140 dB). When the pixel light intensity of the log scale changes above or below the threshold, the event camera is triggered to form "ON" and "OFF" events. The characteristics of the event camera make it particularly good at perceiving the dynamic obstacles, but the way of data stream output of the event camera is completely different from the way of frame output of the traditional camera, and cannot be simply used directly.

Therefore, based on the investigation and analysis of the existing obstacle avoidance and navigation technology, the present invention combines the advantages of laser radar and the event camera and discards the disadvantages of both to fuse the radar data and the processed event data for inputting the data into a network. A fusion decision module with a learnable threshold built by the spiking neural network is used for guiding the robot to move. The validity of the module is verified by an obstacle avoidance and navigation task of the robot. The input of the method comprises the data from a laser radar range finder mounted on a robot platform and the event data of the event camera, and the output is the action to be taken by the robot, including linear and angular velocities. The method can effectively adapt to different static and dynamic environments and maintain efficient obstacle avoidance and navigation decisions.

SUMMARY

The purpose of the present invention is to realize a robot obstacle avoidance method in a dynamic environment by fusing laser radar data and processed event camera data and combining with the intrinsic learnable threshold of the spiking neural network for a scenario comprising dynamic obstacles. The method comprises a hybrid spiking variational autoencoder module, a population coding module and a middle fusion decision module with learnable threshold. A robot dynamic obstacle avoidance method based on a multimodal spiking neural network is designed to obtain external radar and event data for a robot for autonomous navigation and obstacle avoidance.

The technical solution of the present invention is as follows:

A robot dynamic obstacle avoidance method based on a multimodal spiking neural network comprises the following steps:

step 1, carrying a robot simulation model;

carrying a two-dimensional laser radar and an event camera simultaneously by a robot for perceiving an environment and acquiring laser radar data and event data;

step 2, building a hybrid spiking variational autoencoder module to generate event camera data;

encoding the original (x, x) event data with sparse features by the hybrid spiking variational autoencoder module and simplifying into (1, x/2) one-dimensional vector event camera data with highly concentrated features; and acquiring the event data from an event camera carried by the robot to form a dataset which is inputted to the hybrid spiking variational autoencoder module for generating a low-dimensional latent vector as the event camera data inputted by a subsequent population coding module;

the hybrid spiking variational autoencoder module comprises a spiking variational autoencoder and a decoder; the spiking variational autoencoder comprises 4 layers of convolutional spiking neural networks, and each layer of convolutional spiking neural network is composed of LIF (Leaky Integrate-and-Fire) neurons; the spiking variational autoencoder records the states of all the LIF neurons in a path process of data interaction with the robot at each moment and transmits the states to a next moment for learning the weight of the spiking variational autoencoder; the decoder comprises 4 layers of deconvolutional artificial neural networks; the spiking variational autoencoder is responsible for learning (x, x)-dimensional event data features and storing into an x/2-dimensional latent vector; the decoder is used for reversely verifying the validity of the spiking variational autoencoder, and reconstructing the value of the latent vector into original event data by taking a conventional UAE (variational autoencoder) loss function as an optimization objective; and when the decoder can reconstruct the original event data, it represents that the training of the spiking variational autoencoder is completed;

step 3, encoding multimodal data into spiking sequence data by population coding and Poisson coding;

connecting the event camera data and the laser radar data in series into multimodal data; converting the multimodal data into a stimulation strength value by the population coding module, and generating, by Poisson coding, the spiking sequence data from the stimulation strength value for direct input into a subsequent middle fusion decision module;

the population coding module comprises 10 LIF neurons for making up for the inadequacy of single LIF neuron coding and reducing information loss when the multimodal data is converted to the spiking sequence data;

step 4, constructing the middle fusion decision module which comprises a middle fusion module and a control decision module; inputting the spiking sequence data obtained in step 3 into the middle fusion decision module to output the motion decision of the robot;

step 4.1, aligning, by the middle fusion module, the event camera spiking sequence data and the laser radar spiking sequence data into two (1,c) one-dimensional vectors through the LIF neurons composed of two fully connected layers, and connecting the two one-dimensional vectors directly to form fused feature data; adding the middle fusion module into a learnable threshold mechanism; calculating the learnable threshold by a tanh (x) function; when the middle fusion module conducts back propagation, updating the network weight and the learnable threshold of the middle fusion module; controlling, by the learnable threshold, the firing frequency of information transmitted by the LIF neurons, and according to the update of the threshold, conducting adaptive fusion of the event camera data and the laser radar data at different firing frequencies to obtain feature data;

step 4.2, the control decision module comprises four fully connected layers built by the spiking neural network; the fully connected layers are composed of the LIF neurons; embedding the control decision module into a deep reinforcement learning framework DDPG, replacing an actor network of the existing deep reinforcement learning framework DDPG by the spiking neural network to make decisions in the form of spiking, conducting autonomous trial and error learning and determining the threshold of the middle fusion module until optimal feature data is confirmed;

the input of the control decision module is the feature data fused by the middle fusion module; making action decisions through the four fully connected layers; taking a mean value added by the output values of the control decision module on all time steps as a value that represents the values of the left and right wheel speeds of the robot; and then converting into the action output of the linear and angular velocities through the dynamics of the robot to conduct autonomous perception and decision;

adding all the LIF neurons in the control decision module into the learnable threshold mechanism; calculating the learnable threshold by the tanh (x) function; and when the control decision module conducts back propagation, updating the network weight and the learnable threshold of the control decision module so that the threshold of each layer of LIF neurons is maintained at a different level.

The x is 128.

The laser radar data is an 18-dimensional vector, the event camera data is a 64-dimensional vector, and the robot speed information and the robot distance information are both 3-dimensional vectors.

To solve the problem of obstacle avoidance in dynamic scenarios, a URDF model of a TurtleBot-ROS robot is used as an experimental robot, equipped with a 2-dimensional laser radar and the event camera for perceiving the environment; training environments are built by using a static Block obstacle in a ROS-Gazebo simulator, and 4 environments with increasing difficulty are designed to complete the training in different scenarios and phases; and 12 dynamic obstacles are manually added into the ROS-Gazebo as the test scenarios in the dynamic environment for testing the validity of the robot dynamic obstacle avoidance method based on the multimodal spiking neural network.

The present invention has the following beneficial effects: the present invention solves the difficulty of failure of obstacle avoidance due to the difficulty in perceiving the dynamic obstacles (passing passers-by, moving machines, and suddenly thrown other objects) in the obstacle avoidance task of the robot. The present invention helps the robot to fully perceive the static information and the dynamic information of the environment, uses the learnable threshold mechanism of the spiking neural network for efficient reinforcement learning training and decision making, and realizes autonomous navigation and obstacle avoidance in the dynamic environment. For the method of fusing the event data and the radar data to guide the dynamic obstacle avoidance of the robot, the robustness is verified in robot obstacle avoidance tasks in different scenarios, and the validity of the method is proved through comparison experiments. An event data enhanced model is combined to better adapt to the dynamic environment for obstacle avoidance, which greatly increases the success rate. In the comparison experiments, the method achieves the optimal performance on the average success rate, and has great advantages in complex scenarios.

The present invention is applied to robot obstacle avoidance and navigation tasks in different obstacle avoidance scenarios, including training models and test scenarios with static obstacles only and training models and test scenarios with dynamic obstacles. The validity and applicability of the method in different obstacle avoidance scenarios are proved.

DESCRIPTION OF DRAWINGS

FIG. 2(a-1) is a successful case of visualization results of an SAN method experiment.

FIG. 2(a-2) is a failed case of visualization results of an SAN method experiment.

FIG. 2(b-1) is a successful case of visualization results of a PopSAN method experiment.

FIG. 2(b-2) is a failed case of visualization results of a PopSAN method experiment.

FIG. 2(c-1) is a successful case of visualization results of a BDETT method experiment.

FIG. 2(c-2) is a failed case of visualization results of a BDETT method experiment.

FIG. 2(d-1) is a successful case of visualization results of an experiment of the present invention.

FIG. 2(d-2) is a failed case of visualization results of a method experiment of the present invention.

Figure 1A:
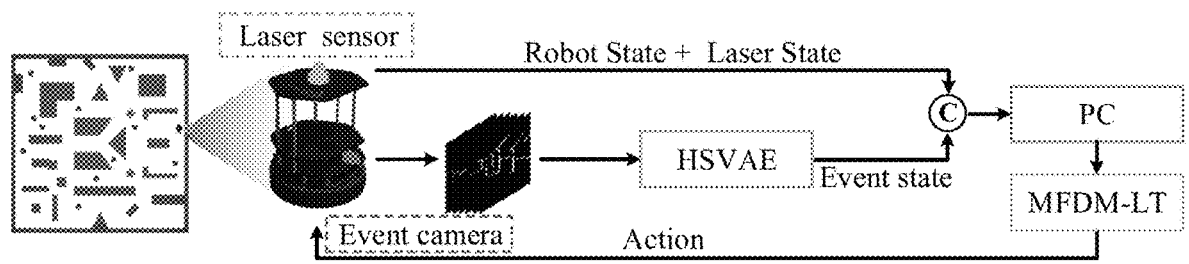
FIG. 1(a) is a structural schematic diagram of a robot dynamic obstacle avoidance method EBM-SAN based on a multimodal spiking neural network in the present invention. In the figure, squares are static obstacles and circles are dynamic obstacles.
Figure 1B:
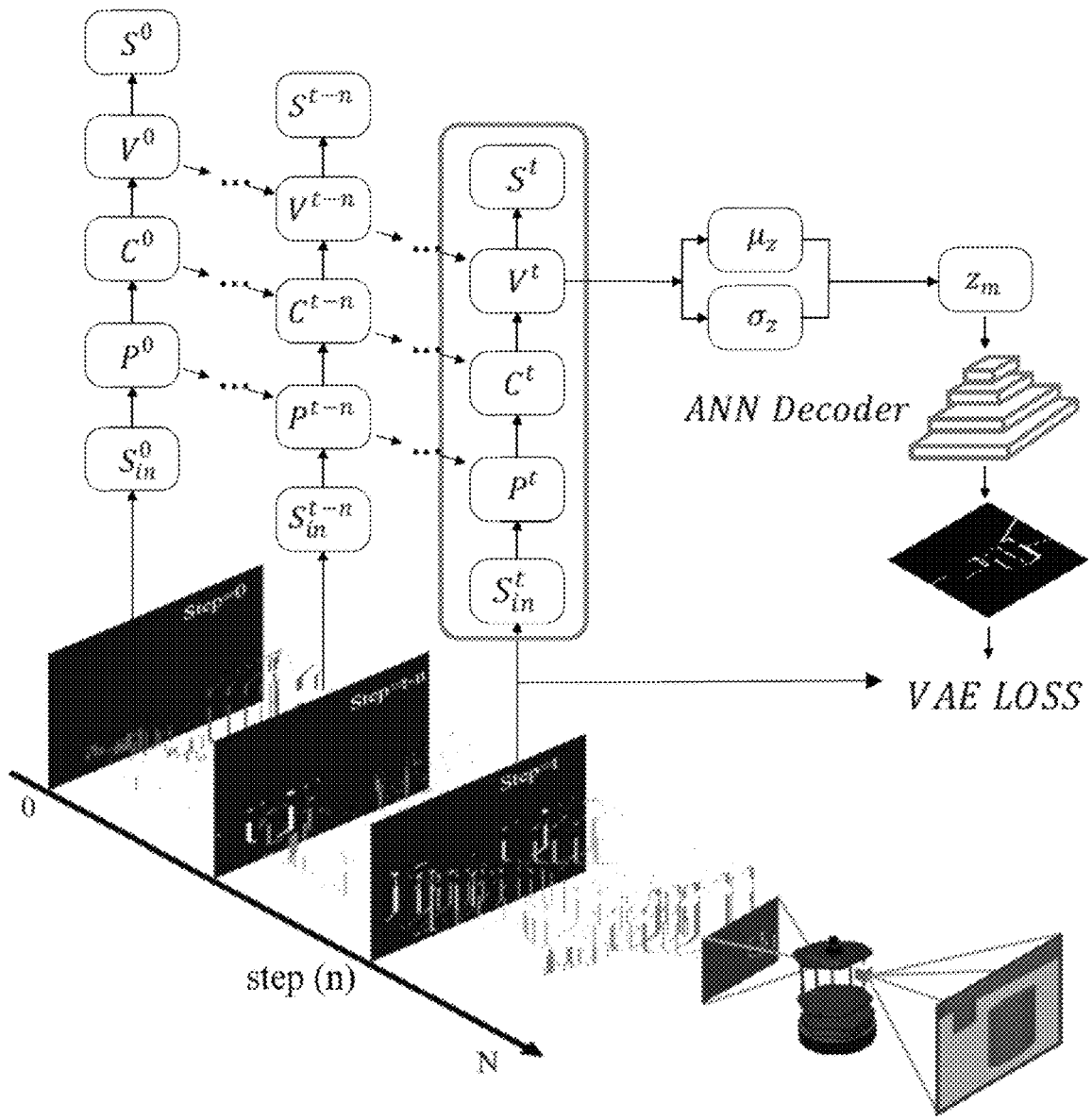
FIG. 1(b) is a structural schematic diagram of a hybrid spiking variational autoencoder module HSVAE.
Figure 1C:
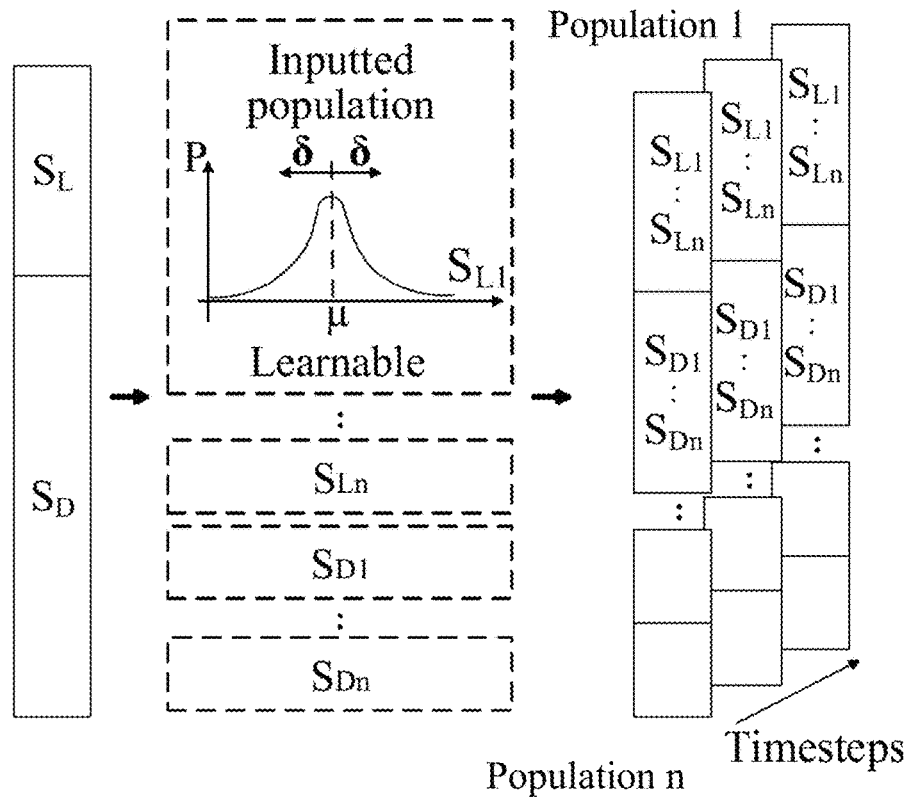
FIG. 1(c) is a structural schematic diagram of a population coding module PC.
Figure 1D:
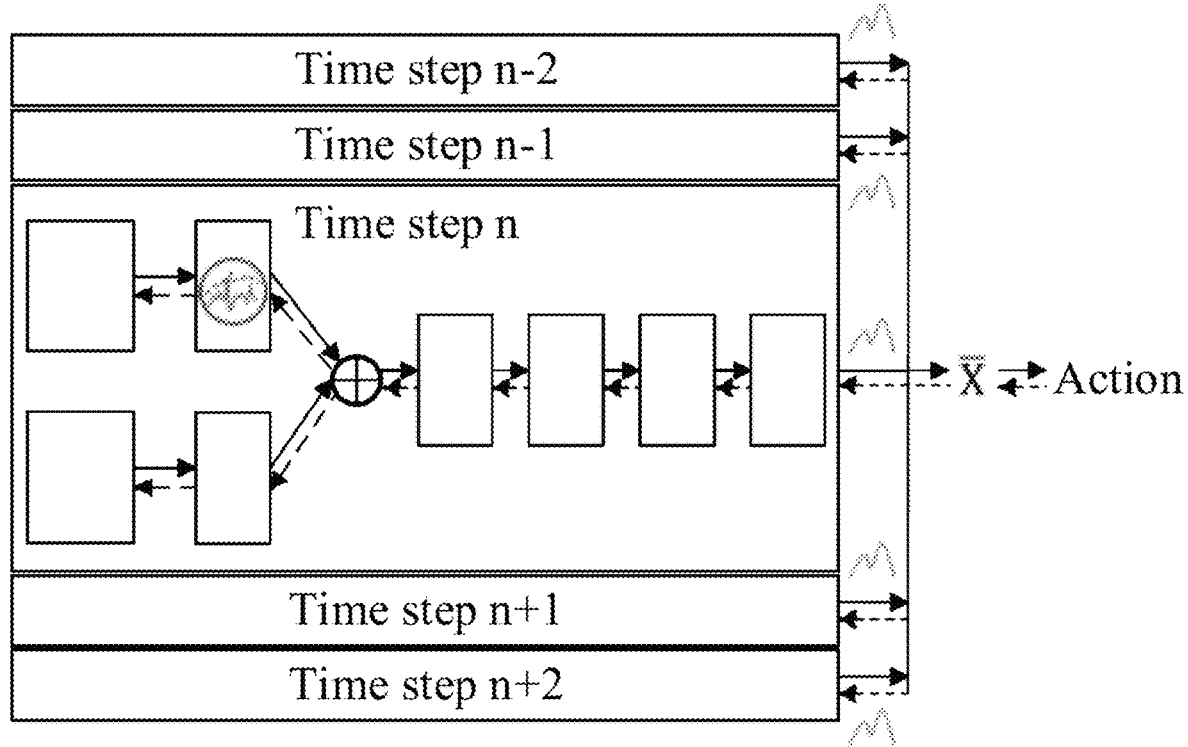
FIG. 1(d) is a structural schematic diagram of a middle fusion decision module MFDM-LT.

In the figures:  is series connection; → is backward; ← is forward; ⊕ is addition;  is spiking.

DETAILED DESCRIPTION

Specific embodiments of the present invention are further described below in combination with accompanying drawings and the technical solution.

A robot dynamic obstacle avoidance method based on a multimodal spiking neural network comprises the following steps:

step 1, carrying a robot simulation model;
step 2, training a hybrid spiking variational autoencoder module;

The event data is obtained from an event camera mounted on a TurtleBot-ROS robot and saved. After the training process is repeated, enough event data is obtained to form a dataset. A spiking variational autoencoder is constructed by using a spiking neural network, wherein the spiking variational autoencoder is responsible for learning (128, 128)-dimensional input data features and storing into a 64-dimensional latent vector. A decoder attempts to reconstruct the original input data through the value of the latent vector. When the hybrid spiking variational autoencoder is trained, the decoder can approximately generate the original data, which means that most of the features of the event data are extracted into the latent vector. After the training is ended, the trained spiking variational autoencoder prevails.

The original (128, 128) event data with sparse features is coded by the hybrid spiking variational autoencoder and can be simplified into (1, 64) one-dimensional vector data with highly concentrated features, so as to facilitate the subsequent network processing of the event data.

Step 3, population coding module;

One-dimensional event camera data after event data processing is acquired, and then inputted into the population coding module together with laser radar data for processing. After processing by the population coding module, the (88, 10, 5) spiking sequence data that can be directly inputted into the subsequent spiking neural network module is obtained. LIF neurons use the mechanism of population coding to make up for the inadequacy of information of a single neuron activity, and this mode can be used to encode and feed back the information of the neuron population into the spiking sequence of the spiking neural network. A specific mode is shown in formulas (1-2):

$$\begin{cases} A_{P_{i,j}} = \text{EXP}\left(-\frac{1}{2} \cdot \left(\frac{s_i - \mu_{i,j}}{\sigma_{i,j}}\right)2\right) \\ A_P = [A_{P_{1,1}}, \ldots, A_{P_{i,j}}, \ldots, A_{P_{N,J}}] \end{cases} \quad (1)$$

$$P(O_{k,t} = 1) = C_R^r A_{P_k}^r (1 - A_{P_k})^{R-r}, \quad (2)$$

i is the serial number of an input state, j is the serial number of an LIF neuron in the population, and $A_P$ is the stimulation strength after population coding.

Step 4.1, middle fusion module with a learnable threshold;

The data after population coding is inputted into a middle fusion decision module. The middle fusion decision module is composed of a middle fusion module and a control decision module. The middle fusion module aligns two modal data into two (1,20) one-dimensional vectors through the LIF neurons composed of two fully connected layers, and the two one-dimensional vectors are connected directly to form fused feature data.

Step 4.2, control decision module

The control decision module inputs the processed multimodal data through four fully connected layers built by the spiking neural network, and outputs the motion decision of the robot. The control decision module is embedded into a deep reinforcement learning framework DDPG, and the spiking neural network replaces an Actor network for decision making in the form of spiking and conducts autonomous trial and error learning. The input of a control decision network comprises 18-dimensional laser radar data, 64-dimensional event camera data, 3-dimensional speed information, and 3-dimensional distance information, i.e., 88-dimensional state information; an action decision is made through the 4 fully connected layers with a network structure of 88-256-256-256-2; and final two actions represent the left and right wheel speed of the robot respectively, so as to conduct autonomous perception and decision making. The trained model forms a dynamic environment in the environment of ROS-Gazebo by manually adding moving cylindrical obstacles, so as to achieve the dynamic obstacle avoidance of the robot.

To further explore the performance of the learnable threshold in multimodal reinforcement learning, the mechanism of the learnable threshold is added to both the middle fusion module and the control decision module, and the optimization ability of threshold parameters is given to the spiking neural network. In the process of training, the corresponding levels of all the neurons depend not only on an internal state, but also on the threshold level. In each back propagation of the network, both the network weight and the neuron threshold are updated.

The two-dimensional laser radar and the event camera are carried by the robot for perceiving the environment; training environments are built by using a static Block obstacle in a ROS-Gazebo simulator, and n environments with increasing difficulty are designed to complete the training in different scenarios and phases; and m dynamic obstacles are added in the ROS-Gazebo simulator as the test scenarios in the dynamic environment to test the validity of the method.

The method uses an LIF neuron model as the main neuronal structure of the network and uses the DDPG as the framework for deep reinforcement learning. The robot states comprise laser radar data, event camera data, the distance to a target point and the speed at the previous moment; the action is composed of linear velocity and angular velocity of the robot; a reward function contains the state of the distance to the target at each moment (positive reward if closer, and vice versa), and minus 20 if a collision occurs and plus 30 if it reaches the target point. The robot is encouraged not to take too large an action at each step, i.e. not to exceed 1.7 times the angular velocity at the previous moment.

The reinforcement learning algorithm is implemented in Pytorch. Stochastic gradient descent is used for the reinforcement learning network with a momentum value of 0.9, a weight decay of 1e-4, a learning rate of 1e-5, a decay factor of 0.99, a maximum step size of 150 and a batch size of 256. In the embodiments of the present invention, the learning process is terminated after 2,000,000 training paths, and it takes approximately 7 hours to train the strategy on a computer equipped with an i7-7700 CPU and an NVIDIA GTX 1080Ti GPU. To verify the validity of the network, the network is compared with the SAN model of the traditional method, a POPSAN model simply added into the population coding, and a BDETT model with dynamic thresholds to verify the validity of the present invention. Ablation experiments are also performed on all the modules proposed in the model to prove the validity of each part.

FIG. 1(a) is a structure of a robot dynamic obstacle avoidance method based on a multimodal spiking neural network, which is composed of an environment perception phase and a control decision phase and specifically comprises a hybrid spiking variational autoencoder module, a population coding module, a middle fusion module with a learnable threshold and a control decision module with a learnable threshold. Taking the laser radar data and the event camera data as the input, the event data is processed by the pre-trained hybrid spiking variational autoencoder. After the fusion of the two modes, the spiking neural network containing a learnable threshold mechanism is inputted, and the decision action of the robot is outputted finally by reinforcement learning.

FIG. 2 shows the visualization results of comparison experiments of an obstacle avoidance network model of the robot, wherein FIG. 2(a-1) and FIG. 2(a-2) are SAN methods; FIG. 2(b-1) and FIG. 2(b-2) are POPSAN methods; FIG. 2(c-1) and FIG. 2(c-2) are BDETT methods; FIG. 2(d-1) and FIG. 2(d-2) are EEM-SAN methods of the present invention. The robot is tested at the same initialized starting point and end point, and 200 tests are conducted by each method. Contact with a wall or dynamic obstacle is considered a failure of this round, which is marked on the right side of the figure. Walking to the end point is considered as a success of this round, which is marked on the left side. Through the comparison of four methods, it can be seen that the present invention has significant advantages. At the position of a corner edge that is difficult to be processed by other methods, the present invention can successfully avoid this position and reach the end point, which proves that the present invention has great advantages in complex scenarios.

Quantitative verification results of the comparison experiments are shown in Table 1, including quantitative performance of the obstacle avoidance ability of all the methods under dynamic and static conditions of two different test maps, wherein the success rate represents the percentage of 200 tests that the robot successfully passes.

TABLE 1

| Method | Dynamic Environment | Static Environment | |
|---|---|---|---|
| | Maximum speed 1 m/s Map 1 success rate/Map 2 success rate | Maximum speed 1 m/s Map 1 success rate/Map 2 success rate | maximum speed 0.5 m/s Map 1 success rate/Map 2 success rate |
| SAN | 0.580/0.577 | 0.645/0.560 | 0.978/0.966 |
| PopSAN | 0.598/0.618 | 0.805/0.718 | 0.983/0.973 |
| BDETT | 0.657/0.625 | 0.735/0.728 | 0.975/0.923 |
| The present invention | 0.765/0.743 | 0.870/0.848 | 1.000/0.985 |

The invention claimed is:

1. A robot dynamic obstacle avoidance method based on a multimodal spiking neural network, comprising the following steps:

step 1, carrying a robot simulation model;

carrying a two-dimensional laser radar and an event camera simultaneously by a robot for perceiving an environment and acquiring laser radar data and event data;

step 2, building a hybrid spiking variational autoencoder module to generate event camera data;

encoding the original (x, x) event data with sparse features by the hybrid spiking variational autoencoder module and simplifying into (1, x/2) one-dimensional vector event camera data with highly concentrated features; and acquiring the event data from an event camera carried by the robot to form a dataset which is inputted to the hybrid spiking variational autoencoder module for generating a low-dimensional latent vector as the event camera data inputted by a subsequent population coding module;

the hybrid spiking variational autoencoder module comprises a spiking variational autoencoder and a decoder; the spiking variational autoencoder comprises 4 layers of convolutional spiking neural networks, and each layer of convolutional spiking neural network is composed of LIF (Leaky Integrate-and-Fire) neurons; the spiking variational autoencoder records the states of all the LIF neurons in a path process of data interaction with the robot at each moment and transmits the states to a next moment for learning the weight of the spiking variational autoencoder; the decoder comprises 4 layers of deconvolutional artificial neural networks; the spiking variational autoencoder is responsible for learning (x, x)-dimensional event data features and storing into an x/2-dimensional latent vector; the decoder is used for reversely verifying the validity of the spiking variational autoencoder, and reconstructing the value of the latent vector into original event data by taking a conventional UAE (variational autoencoder) loss function as an optimization objective; and when the decoder can reconstruct the original event data, it represents that the training of the spiking variational autoencoder is completed;

step 3, encoding multimodal data into spiking sequence data by population coding and Poisson coding;

connecting the event camera data and the laser radar data in series into multimodal data; converting the multimodal data into a stimulation strength value by the population coding module, and generating, by Poisson coding, the spiking sequence data from the stimulation strength value for direct input into a subsequent middle fusion decision module;

the population coding module comprises 10 LIF neurons for making up for the inadequacy of single LIF neuron coding and reducing information loss when the multimodal data is converted to the spiking sequence data;

step 4, constructing the middle fusion decision module which comprises a middle fusion module and a control decision module; inputting the spiking sequence data obtained in step 3 into the middle fusion decision module to output the motion decision of the robot;

step 4.1, aligning, by the middle fusion module, the event camera spiking sequence data and the laser radar spiking sequence data into two (1,c) one-dimensional vectors through the LIF neurons composed of two fully connected layers, and connecting the two one-dimensional vectors directly to form fused feature data; adding the middle fusion module into a learnable threshold mechanism; calculating the learnable threshold by a tanh (x) function; when the middle fusion module conducts back propagation, updating the network weight and the learnable threshold of the middle fusion module; controlling, by the learnable threshold, the firing frequency of information transmitted by the LIF neurons, and according to the update of the threshold, conducting adaptive fusion of the event camera data and the laser radar data at different firing frequencies to obtain feature data;

step 4.2, the control decision module comprises four fully connected layers built by the spiking neural network; the fully connected layers are composed of the LIF neurons; embedding the control decision module into a deep reinforcement learning framework DDPG, replacing an actor network of the existing deep reinforcement learning framework DDPG by the spiking neural network to make decisions in the form of spiking, conducting autonomous trial and error learning and determining the threshold of the middle fusion module until optimal feature data is confirmed;

the input of the control decision module is the feature data fused by the middle fusion module; making action decisions through the four fully connected layers; taking a mean value added by the output values of the control decision module on all time steps as a value that represents the values of the left and right wheel speeds of the robot; and then converting into the action output of the linear and angular velocities through the dynamics of the robot to conduct autonomous perception and decision;

adding all the LIF neurons in the control decision module into the learnable threshold mechanism; calculating the learnable threshold by the tanh (x) function; and when the control decision module conducts back propagation, updating the network weight and the learnable threshold of the control decision module so that the threshold of each layer of LIF neurons is maintained at a different level.

2. The robot dynamic obstacle avoidance method based on the multimodal spiking neural network according to claim 1, wherein a URDF model of a TurtleBot-ROS robot is selected by the robot as an experimental robot; and the x is 128.

3. The robot dynamic obstacle avoidance method based on the multimodal spiking neural network according to claim 1, wherein the laser radar data is an 18-dimensional vector, the event camera data is a 64-dimensional vector, and the robot speed information and the robot distance information are both 3-dimensional vectors.

4. The robot dynamic obstacle avoidance method based on the multimodal spiking neural network according to claim 2, wherein the laser radar data is an 18-dimensional vector, the event camera data is a 64-dimensional vector, and the robot speed information and the robot distance information are both 3-dimensional vectors.

* * * * *